July 24, 1951 W. W. CALHOUN 2,561,686

SEQUENCE SWITCH APPARATUS

Filed Sept. 17, 1945 5 Sheets-Sheet 1

Wendell W. Calhoun
INVENTOR

BY E. A. Buchanan
ATTORNEY

July 24, 1951 W. W. CALHOUN 2,561,686

SEQUENCE SWITCH APPARATUS

Filed Sept. 17, 1945 5 Sheets-Sheet 2

Wendell W. Calhoun
INVENTOR

BY C. A. Benson [signature]
ATTORNEY

July 24, 1951 W. W. CALHOUN 2,561,686

SEQUENCE SWITCH APPARATUS

Filed Sept. 17, 1945 5 Sheets-Sheet 3

Wendell W. Calhoun
INVENTOR
BY C. A. Buckhorn
ATTORNEY

July 24, 1951 W. W. CALHOUN 2,561,686

SEQUENCE SWITCH APPARATUS

Filed Sept. 17, 1945 5 Sheets-Sheet 4

Wendell W. Calhoun
INVENTOR

BY E. A. Buchhorn
ATTORNEY

July 24, 1951 W. W. CALHOUN 2,561,686

SEQUENCE SWITCH APPARATUS

Filed Sept. 17, 1945 5 Sheets-Sheet 5

Wendell W. Calhoun
INVENTOR

BY E. A. [signature]
ATTORNEY

Patented July 24, 1951

2,561,686

UNITED STATES PATENT OFFICE 2,561,686

SEQUENCE SWITCH APPARATUS

Wendell W. Calhoun, Portland, Oreg.

Application September 17, 1945, Serial No. 616,793

11 Claims. (Cl. 200—37)

Figure 1:
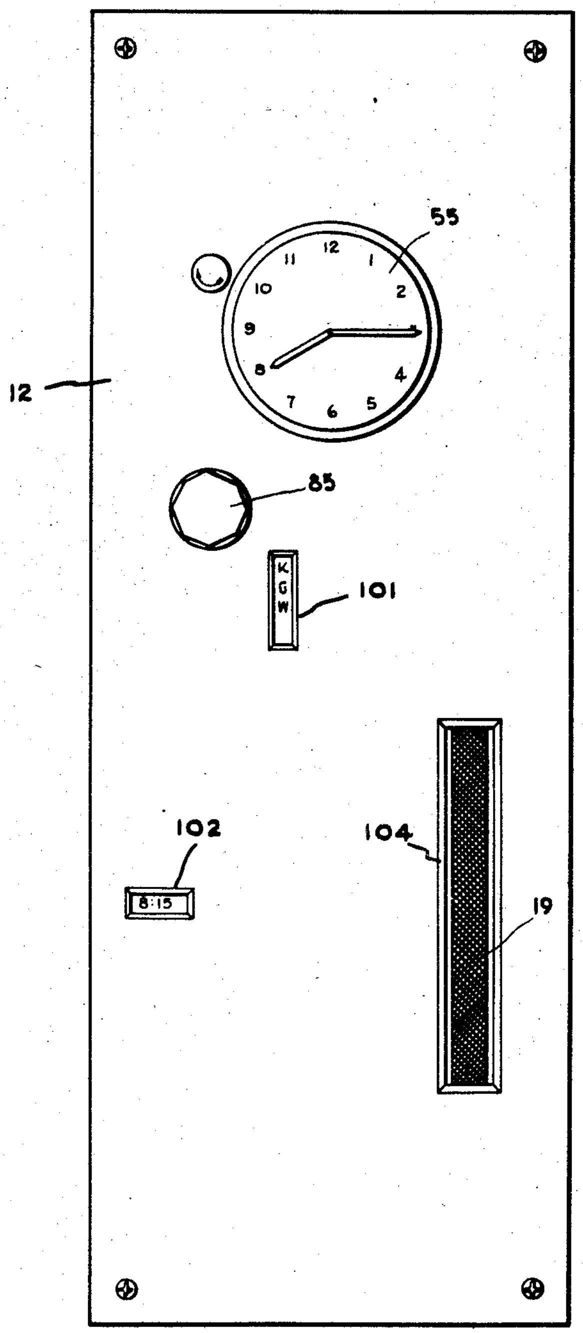

The present invention relates to sequence switch apparatus and while it is not necessarily limited thereto it is particularly adaptable for use in controlling reception programs of radio receivers.

Frequently it is desirable to provide a motor operated switch apparatus for controlling the energization of a plurality of electrical circuits in a predetermined sequence. While various forms of switching apparatus have been devised heretofore it is generally not possible to change the sequence without disconnecting the apparatus from the power supply and partially dismantling it to obtain access to the selector mechanism. Such apparatus is therefore relatively inflexible and hence adaptable for use only in specific applications. For certain applications, such as for controlling a radio broadcast receiver, it is desirable to provide a switch apparatus whereby a plurality of circuits such as the tuned station selector circuits may be closed in a predetermined sequence in order to bring in a predetermined series of programs throughout the day and which program is to be repeated daily. It may be desirable to alter the program from time to time, so as to substitute one station for another during a particular period or to shut off the radio for such period and the sequence switching apparatus should be capable of such adjustment by simple manual control without requiring the use of any tools and without requiring any dismantling of apparatus.

It is an object of the present invention, therefore, to provide a new and improved sequence switching apparatus so constructed and arranged whereby the sequence may be changed at will without the use of tools and without requiring dismantling of the apparatus.

A further object of the invention is to provide a new and improved motor driven sequence switch apparatus for controlling a plurality of electrical circuits in a predetermined timed sequence, the apparatus being so constructed and arranged whereby the sequence may be altered at will by the manipulation of a knob extending from the front panel of the apparatus without requiring disconnection of the switch apparatus from the power supply or from the controlled circuits.

A still further object of the present invention is to provide a new and improved sequence switch apparatus for controlling a plurality of electrical circuits, the apparatus including a plurality of adjustable selector elements adapted to engage with and operate cooperating switches connected in the controlled circuits and with manual means operable from the exterior of the housing for adjusting the selector elements.

A more specific object of the present invention is to provide a new and improved radio program controller including a plurality of switches connected for effecting the energization of the tuned broadcast station circuits of the radio receiver in a selective sequence, the controller being driven by a clockwork mechanism whereby the radio set is controlled according to predetermined time intervals.

In accordance with an illustrated embodiment the invention comprises a rotatably mounted drum having a plurality of equally radially spaced selector detents adjustably mounted on the periphery of the drum for movement longitudinally of the drum into one of a plurality of axially spaced radial planes. A timer motor is provided for notching the drum in one direction of rotation through angles of movement corresponding to the spacing between the selector elements at predetermined time intervals. A plurality of switches are arranged adjacent the drum each having a portion extending adjacent the path of travel of the selector detents arranged in each of said radial planes and adapted to be engaged and operated thereby. A lever mechanism is provided in the apparatus and which is operable by a knob mounted on the panel of the apparatus by means of which the selector detents may be adjusted at will from one of the radial planes to the other to vary the sequence of switch operation. The switches are each connected for operating a corresponding circuit of the radio receiver tuned to a particular broadcast station whereby upon rotation of the drum a predetermined program is tuned in. The connections to the radio receiver provide for manual operation of the receiver at any time independently of the operation of the program controller mechanism.

For a consideration of what is believed novel and inventive, the attention is directed to the following description taken in connection with the accompanying drawings while the features of novelty will be pointed out with greater particularity in the appended claims.

Figure 8:
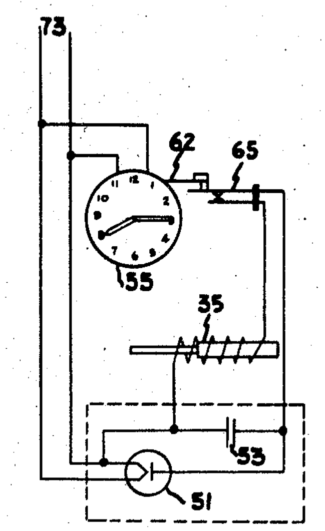
Figure 2:
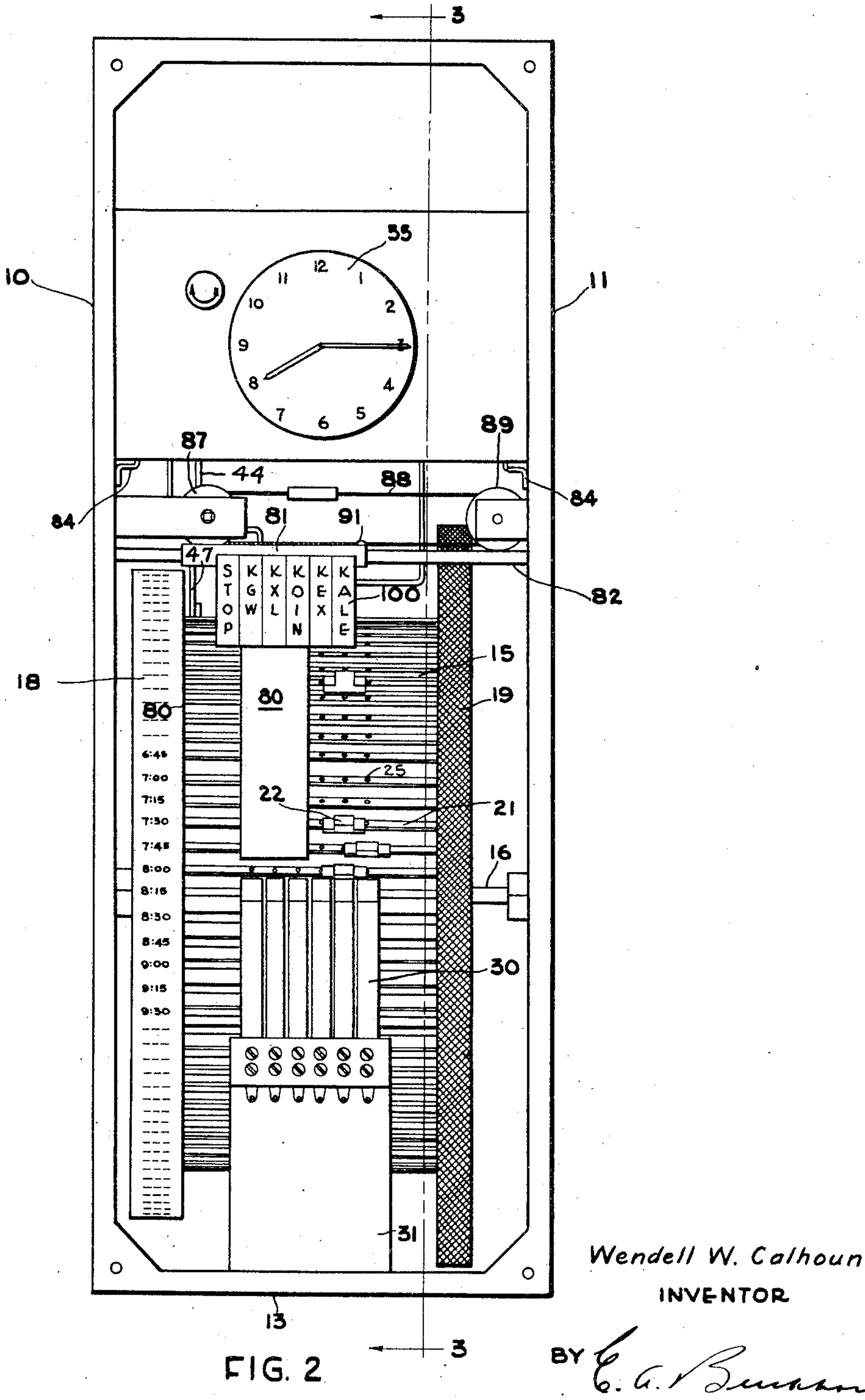
Figure 3:
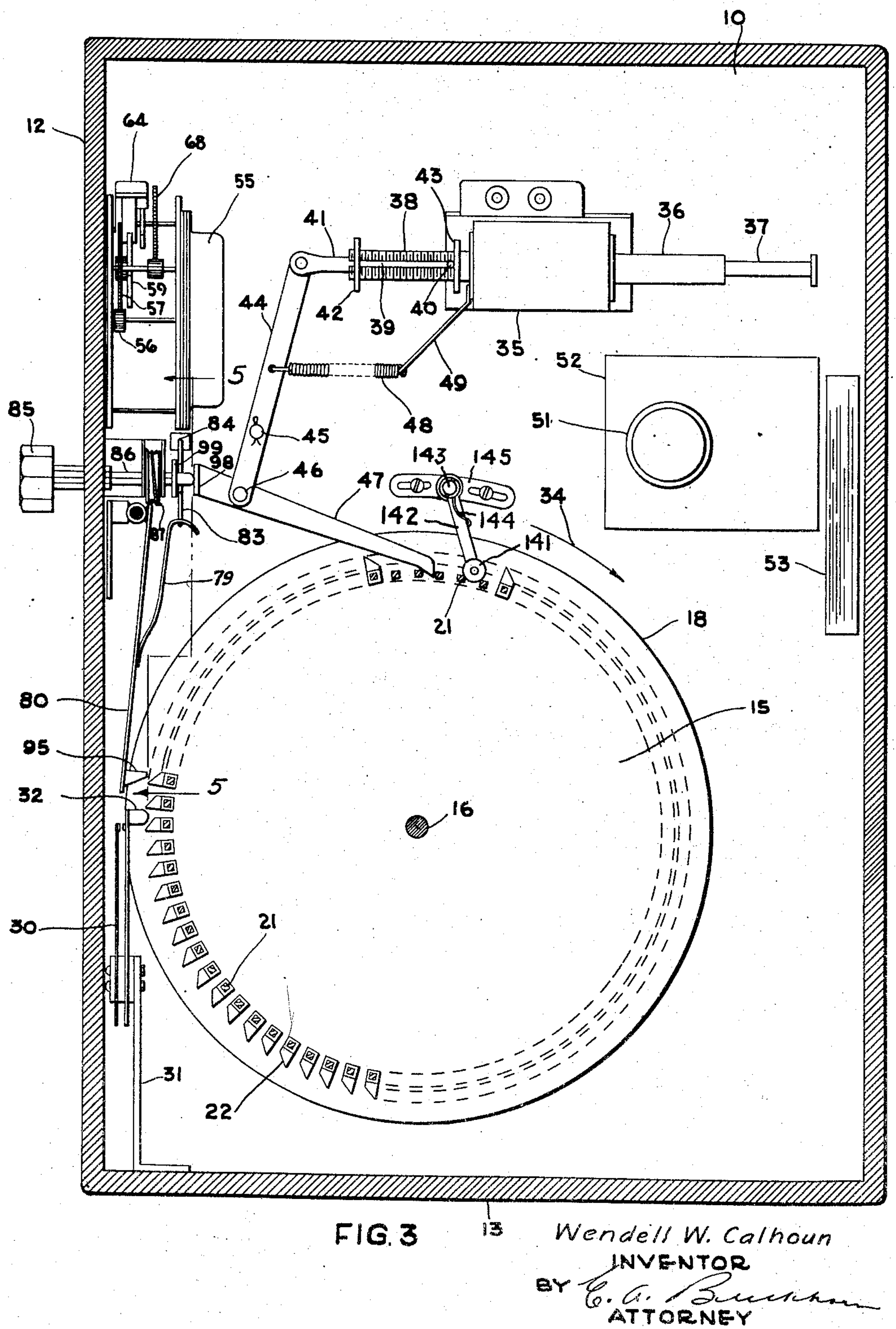
Figure 4:
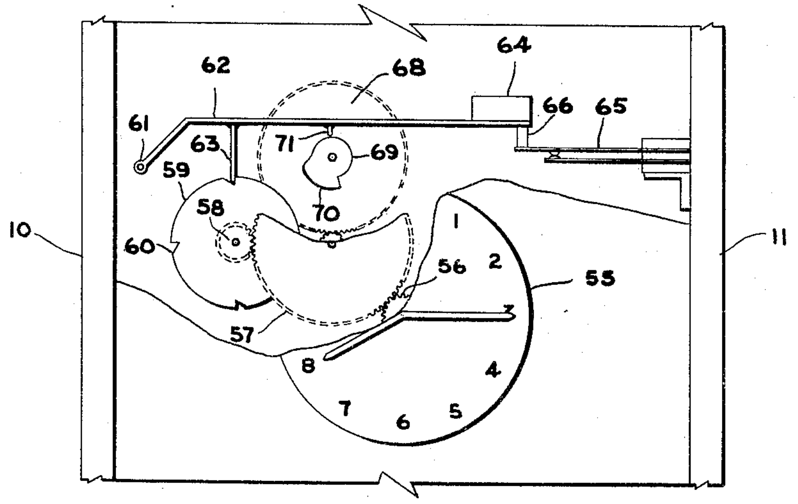
Figure 5:
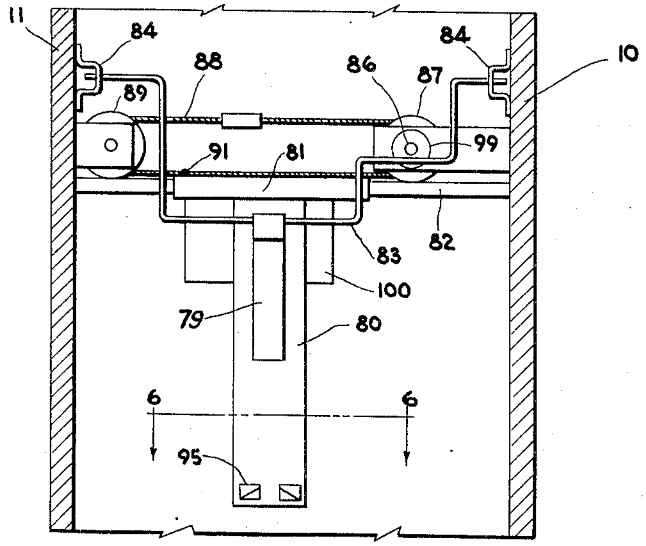
Figure 7:
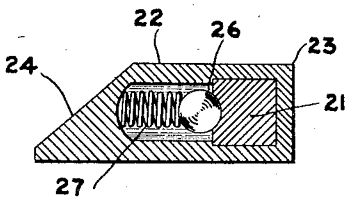
Figure 6:
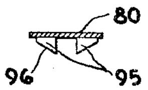
Figure 10:
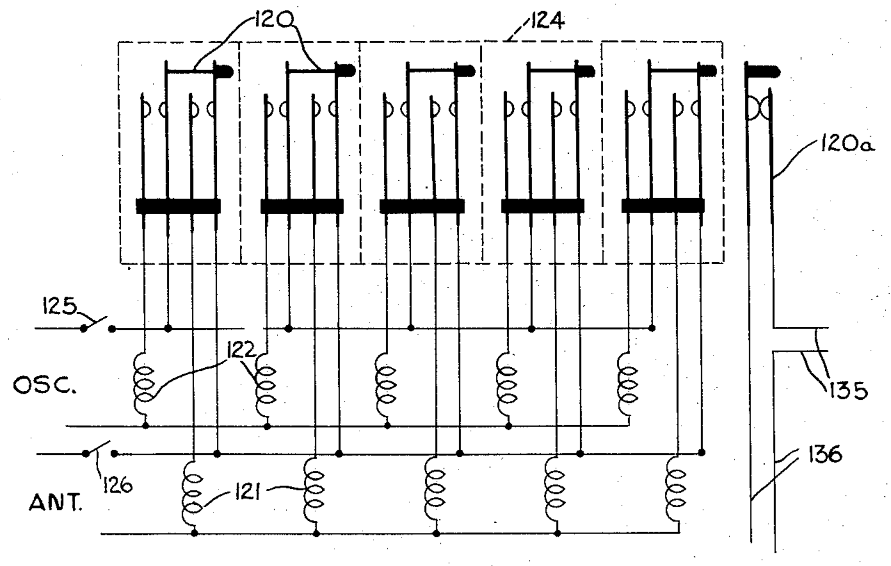
Figure 9:
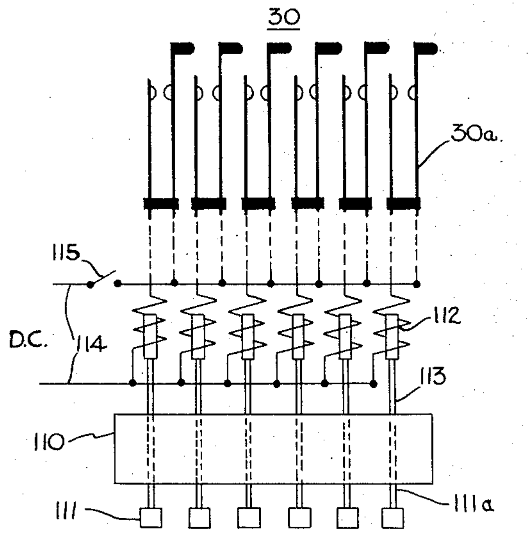
Figure 11:
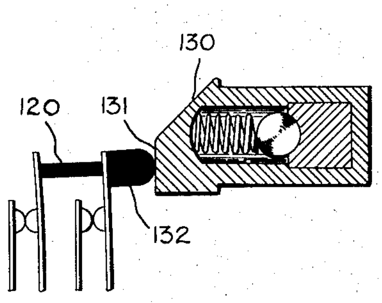

In the drawings Fig. 1 is a front elevation showing the front panel of the apparatus constructed in accordance with one form of the present invention; Fig. 2 is a front elevation of the apparatus shown in Fig. 1 but with the panel removed; Fig. 3 is a cross-sectional view taken along the line 3—3 of Fig. 2; Fig. 4 is a fragmentary enlarged detail view, certain portions being broken away, illustrating the motor driven timing mechanism embodied in the invention; Fig. 5 is an enlarged detail view taken along the line 5—5 of Fig. 3; Fig. 6 is a cross-sectional view taken along line 6—6 of Fig. 5; Fig. 7 is an enlarged cross-sectional view illustrating one detail of the invention; Fig. 8 is a schematic wiring diagram illustrating the electrical operating circuit for the switch apparatus shown in Figs. 1 to 4 inclusive; Fig. 9 is a schematic wiring diagram illustrating one manner in which the selector switches of the controller may be connected to a push button operatng mechanism of a radio broadcast receiver; and Fig. 10 is a schematic wiring diagram illustrating a further manner in which the selector switches embodied in the present invention may be connected for controlling the tuned station selector circuits of a radio broadcast receiver; and Fig. 11 is an enlarged detail view illustrating a modification of the invention.

Referring now to the drawings, the sequence switch apparatus is included within a housing including opposite side walls 10 and 11, a front panel 12 and a base 13. A drum generally indicated at 15 is rotatably mounted upon a shaft 16 which in turn is suitably supported between the opposite side walls 10 and 11. The drum is comprised of a pair of opposite end discs 18 and 19 between which extend a multiplicity of rectangular bars 21 extending parallel with the shaft 16, or lengthwise of the drum. These bars are arranged in a cylindrical configuration concentrically about the shaft 16 and are spaced circumferentially apart by equal distances. A selector element or detent 22 is slidably arranged upon each of the bars 21, one of the detents being shown in greater detail in Fig. 7. The detents 22 are longitudinally adjustably upon the corresponding supporting bar 21 into one of a plurality of radial planes. The detents 22 each comprise a rectangular sleeve portion 23 which is freely slidable over the corresponding bar 21 and an outstanding lug portion 24 having sloping forward surfaces facing in the direction of rotation of the drum. For facilitating the adjustment of the detents into alignment with each other in the radial planes, the bars 21 are each provided on the outer surface with a plurality of equally spaced apart indentations 25 providing recessed seats for balls 26 provided in a cooperating bore formed in the outstanding lug portion of the detent and urged into engagement with the bar 21 by a small spring 27 arranged therebehind.

A plurality of switches 30 supported upon a bracket 31 are mounted adjacent the forward side of the drum 15 each of the switches having a portion 32 of insulating material extending in the path of travel of the detents 22 arranged in each of the radial planes indicated by the rows of indentations 25 on the bars 21. As illustrated in the view of Fig. 3 the switches 30 are of a normally open contact type so that upon engagement of the portion 32 by one of the detents 22 of the drum the switch contacts are momentarily closed for effecting energization of the circuit in which the switch is connected. It will be obvious, however, that the switches 30 may be of any desired type depending upon the particular application of the sequence controller.

The drum 15 is adapted to be notched with a step by step movement in the direction of rotation indicated by the arrow 34 by an electromagnetic actuating device 35. The device 35 as shown in the drawings is of the direct current type including a solenoid winding and having a non-magnetic sleeve 36 extending therethrough forming a guide for the magnetic armature 37 slidably arranged within the sleeve 36. One end of the sleeve is threaded as indicated at 38 and is provided with a slot 39 along one side through which extends a pin 40 secured to the member 41 attached to the armature 37. A pair of stop nuts 42 and 43 are provided upon the threaded sleeve portion 38 by means of which the length of travel of the armature 37 may be adjusted. The end of the member 41 is pivotally connected to a lever 44 which in turn is pivotally mounted at 45 and connected at its opposite end 46 to the pawl 47. The outermost end of the pawl 47 engages with the bars 21 of the drum 15 adjacent the end disc 18. In the view of Fig. 3, the detents 22 have been omitted from in front of the tip of the pawl 47 for purposes of greater clarity. The armature 37 is biased to the right, as viewed in Fig. 3, by means of a spring 48 shown connected between the lever 44 and a bracket 49 secured to the base of the device 35.

The device 35 is adapted to be energized from a suitable source of direct current, and as shown in the drawings, such source is provided in this instance by a thermionic rectifier indicated at 51 mounted in a base 52 secured to the side wall 10. A wave smoothing capacitor 53 is also shown mounted adjacent the base 52. The electrical connections for the operating circuit will be described more fully hereinafter with particular reference to the wiring diagram of Fig. 8.

The electromagnetic actuating device 35 is adapted to be energized at recurrent periodic intervals by a timer mechanism whereby upon each such energization the pawl 47 will be moved toward the right, as viewed in Fig. 3, by such an amount whereby the drum 15 is rotated through an angle of movement corresponding to the radial spacing between the adjacent bars 21 of the drum. Referring particularly to the fragmentary view of Fig. 4, the timer mechanism comprises an electric clock 55 the hour shaft of the clock being provided with a pinion 56 which is connected by the gear 57 to a further pinion 58 of the same size as pinion 56. Mounted on the same shaft as the pinion 58 is a cam disc 59 having four equally spaced notches 60 in its periphery. Pivotally mounted as at 61 is a lever 62 having a depending portion 63 normally riding upon the periphery of the disc 59. The lever 62 is normally biased downwardly by means of a weight 64 mounted on the outer end thereof and is adapted to engage a switch 65 having an insulating pin 66 extending from the upper surface thereof into the path of travel of the end of the lever 62.

Since the cam disc 59 makes one revolution per hour the rider 63 will drop into one of the notches 60 every fifteen minutes to cause closure of the contacts of the switch 65. The contacts of the switch 65 are held closed only for a short period and will be reopened upon raising of the lever 62 away therefrom by the further rotation of the cam disc 59. The notches are so provided on the cam disc 59 with relation to the position of the rider 63 that the dropping of the rider into the notches occurs on the even hour, quarter hour, half hour, and three-quarter hour of the clock 55. It is to be understood, however, that this particular timing is selected with regard to the specific application for the described invention, that is, as a radio program controller. Since radio broadcast programs are normally timed for such intervals the selector switches 30 are adapted to be actuated at such corresponding intervals. For other applications of the sequence switch apparatus of the present invention any other time interval between successive closures of the switch 65 may be provided. Moreover, it is to be understood, that it is not essential that the switch 65 be operated by a timing motor of the type described since it may equally well be actuated by any other means such as, for example, a condition responsive means.

When used as a radio program controller, it may not be necessary or desirable to make provision for controlling the radio receiver throughout a full twenty-four hour period. Normally, in the average home the radio set is not used for certain periods, for example, from midnight until six a. m. The timer mechanism of the present invention includes means for lifting the switch operating lever 62 to an inoperative position during such periods of non-use of the radio receiver. This means includes a gear 68 meshed with a small pinion on the shaft bearing the gear 57 the ratio of teeth being such that the gear 68 makes one revolution in twenty-four hours. Secured to the shaft of the gear 68 is a cam 69 having a raised portion 70 which is adapted to engage with a depnding rider 71 attached to the lever 62. The position of the raised portion 70 of the cam 69 is such that the lever 62 is lifted thereby during some period, such as, from midnight to six a. m. and during which period the lever 62 will be held in an inoperative position as regards the cam 59 and the switch 65.

Referring now to the wiring diagram of Fig. 8 the clock 55 is adapted to be connected directly across the alternating current source of supply indicated by leads 73. The rectifier tube 51 is also connected across the alternating current supply 73 while the direct current output of the tube 51 is connected in series relation with the winding of the electromagnetic device 35 and the switch 65. If an alternating current actuating device be substituted for the direct current electromagnetic device 35 then, of course, the rectifier 51 may be dispensed with, the rectifier being employed in this instance merely as a convenient method of reducing noise.

In the present embodiment, the bars 21 provided on the drum 15 correspond in number to the number of fifteen minute intervals during that portion of the day over which the operation of the radio receiver is to be controlled. If the radio is to be controlled at fifteen minute intervals throughout a twenty-four hour day then 96 bars must be provided, but if a cam means such as 69, 70 are incorporated in the timer for rendering the sequence switch mechanism inoperative for some period, such as six hours, then a correspondingly fewer number of bars need be provided on the drum 15. In any event, the drum 15 contains such a number of bars with one detent on each so that the switches 30 are controlled thereby at predetermined desired intervals over a predetermined period.

The apparatus of the present invention includes means whereby the position of the detents 22 upon the supporting bar 21 may readily be changed as desired from one radial plane to another for changing the program to be heard over the radio for any certain period. The detent adjusting means includes a lever 80 which is secured to a sleeve 81 slidably mounted upon a rod 82. Secured to the rear side of the lever 80 is a leaf spring 79 which is provided with a hook-shaped end extending over a U-shaped lever 83. The lever 83 extends transversely between the side walls of the housing parallel with the rod 82 and is pivotally supported at its upper ends as at 84. The lever 83 normally depends from its points of pivotal support 84 to hold the lower end of the lever 80 out of engagement of the detents of the drum. A manual operating knob 85 is provided on the end of a squared shaft 86 which shaft extends through the pulley 87 the pulley 87 being nonrotatable relative to the shaft 86. Extending around the pulley 87 is a wire cord 88 which is trained around an idler pulley 89 mounted adjacent the opposite housing side wall the lower end of the wire 88 being connected as at 91 to the sleeve 81. By rotation of the knob 85 the pulley 87 is also rotated whereby the sleeve 81 is carried longitudinally upon the rod 82 and the lever 80 moved across the face of the drum. As illustrated more clearly in the views of Figs. 5 and 6 the lower end of the lever 80 is provided with a pair of pick up fingers 95 having sloping side walls as indicated at 96.

To effect adjustment of the detents 22 upon the corresponding bars 21, the operating knob 85 is first pushed in whereupon the end of the shaft 86 bears against the adjacent end 98 of the pawl lever 47 to first advance the drum 15 by one notch. A collar 99 on the shaft 86 engages with the U-shaped lever 83 to swing it upon its pivot 84 thereby exerting a force through the spring 79 to urge the pick up fingers 95 toward the drum 15. While holding the knob in it is then rotated and the lever 80 is carried across the face of the drum and as one of the fingers 95 engage the detent on the adjacent bar the finger 95 will ride over the detent and which detent will drop relatively into the space between the pair of fingers 95. Having thus picked up the detent then by further rotation of the knob in the desired direction, and while still pressing the knob inwardly against the panel, the detent may be adjusted into the desired radial plane and which may be determined by the index plate 100 secured to the upper end of the lever 80. The index plate bears a series of broadcast station call letters one of which may be read through an opening 101 in the panel 12 of the housing. As the call letters of the desired station appear through the opening 101 the knob 85 is released thereby disengaging the fingers 95 from the detent. To adjust the next successive detent to the desired position the knob 85 may again be pressed inwardly thereby first rotating the drum through an angular movement corresponding to the spacing between a pair of adjacent bars and the procedure outlined above is then repeated.

The disc 18 at the left of the drum, as viewed in Fig. 2, is marked with the time intervals represented by each bar on the drum and which may be read through an opening 102 in the panel 12. For facilitating the reading of the indicia through the opening 102, it may be desirable to provide these figures upon a transparent strip secured to the edge of the disc 18 and to arrange a small lamp therebehind. Such means, however, are old and well known in the art and have been omitted from the drawings in this instance for purposes of greater clarity in the presentation.

The disc 19 forming the opposite end of the drum 15 is preferably of such a diameter that a portion thereof may extend through an elongated opening 104 provided in the panel whereby the drum may be rotated manually and which may be desired during changing of the positions of the detents on the drum. After all of the detents are properly adjusted to suit, the drum is then rotated until the time indicated by clock 55 is read through the opening 102 following which setting, the drum will be automatically controlled by the clock.

The switches 30 controlled by the detents on the drum 15 may be connected in any suitable manner to a radio receiver for controlling the energization of corresponding circuits pretuned to different frequencies of desired boadcast stations. In Fig. 9 is illustrated in diagrammatic form one method in which the switch assembly indicated generally at 30 may be connected for the control of an ordinary push button type of receiver. The receiver in this instance is indicated generally by the rectangle 110 which is provided with a plurality of push buttons 111 which are manually operable for energizing a corresponding circuit pretuned to a corresponding radio broadcast station. Electromagnetic solenoids 112 are provided upon the extensions 113 of the push button rods and each of which solenoids are connected in series with one of the switches 30 and a suitable direct current source of supply indicated by the leads 114. A switch 115 is provided in one of the leads 114 for disconnecting the source of power supply for the solenoids 112 thereby rendering the switches 30 ineffective as during such time when only manual control of the receiver is desired. Assuming that the switch 115 is closed then upon closure of one of the switches 30 and energization of a corresponding solenoid 112 the push button connected thereto will be pulled in thereby closing the particular tuned broadcast station circuit. Since the push buttons 111 as embodied in the normal radio receiver are of the latched in type the solenoids 112 need be energized only momentarily. It will be obvious that any other push button 111 may immediately thereafter be pushed in manually thereby releasing that button which had been latched in previously by energization of one of the solenoids 112.

One of the radial rows of detents on the drum 15, such as that on the right-hand side as viewed in Fig. 2, may be selected for controlling the off button of the receiver. This button is indicated at 111*a* in the normal radio receiver disconnects the radio receiver from the source of power supply the radio receiver will not be energized except when one of the other push buttons is moved to the closed circuit condition. It will be understood that if a succession of immediately adjacent detents are adjusted into the same radial plane for successively operating the same switch 30 the continuity of the reception of a prolonged program will not be interrupted at the end of each fifteen minute interval. Repeated closures of the same switch 30 will result merely in repeated energization of the corresponding solenoid 112 but since the associated push button is already actuated to the closed circuit position such successive energization of the same solenoid will have no effect upon the continuous operation of the receiver.

In Fig. 10 is illustrated a slightly different method in which the switch assembly mounted adjacent the drum 15 may be connected for controlling directly the various tuned circuits of a receiver. Since the oscillator and antenna coils of the receiver are connected in different circuits double pole switches must be provided in lieu of the single pole switches as previously described.

The doubled pole switches in this instance are indicated at 120, the pairs of contacts of each switch are connected in series with corresponding oscillator and antenna coils 122 and 121, respectively. With a switch arrangement of this type it will be necessary to provide shielding around the different switches and which is indicated in Fig. 10 by the dotted lines 124. Manually operable switches 125 and 126 are provided in the oscillator and antenna circuits, respectively, and which may be opened to render ineffective the automatic control of the receiver and to throw it over onto manual operation.

As distinguished from the switches 30 previously described, the switches 120 must be kept closed throughout the period between the successive step movements of the controller drum 15. According to the previous modification, and as illustrated in Fig. 3, the switches 30 are of a normally open contact type and the detents 22 on the drum 15 do not engage with the switches except as the drum is moved through one step. According to the present modification, the contour of either the detents or of the insulating portions of the switches should be so designed that the switches 120 will be held closed by the detents in the stationary position of the drum. For example, as illustrated more clearly in the detailed view of Fig. 11 the detents 130 in this instance may be provided with a flattened outer end as indicated at 131 upon which flattened end portion the insulating bearing portion 132 of the switch 120 is supported in a closed switch position during the positions of rest of the drum. It will be obvious that detents of the shape previously described may be used by suitable modification of the cooperating insulating bearing portion 132 of the switch structure.

The end switch 120*a* may be of a normally closed single pole type and connected for controlling the connection of the source of supply indicated by leads 135 to the receiver through leads 136. Upon engagement of a detent with the switch 120*a* the circuit is opened thereby deenergizing the receiver.

In order to facilitate the positioning of the drum 15 after each step movement thereof by the electromagnetic actuating device 35 I provide a spring biased pawl (see Fig. 3) comprising a roller 141 mounted upon the end of a lever 142 the lever being in turn pivotally mounted upon the end of a pin 143 and biased into engagement with the bars 21 by means of a spring 144. The supporting pin 143 is mounted upon an adjustable bracket 145 and which is secured by suitable screws to the adjacent side wall of the housing. The diameter of the roller 141 is somewhat greater than the spacing between the adjacent bars 21 but extends part-way therebetween to hold the drum 15 in a predetermined angular position after each successive step movement thereof. At the same time this pawl arrangement substantially precludes movement of the drum 15 in the reverse direction which may be undesirable in view of the fact that the detents 22 are provided with a sloping face only on the forward side and if the drum were rotated in the opposite direction the tip of the detents might possibly catch upon the ends of the insulating portions of the switches 30 or 120 and damage the same.

It will be obvious to those skilled in the art that many changes and variations may be made in the apparatus disclosed above but it is contemplated in the following claims to cover all such obvious variations and modifications falling within the true spirit and scope of the present invention.

What I claim is:

1. In a program controller including a rotatable drum, a plurality of radially spaced detents mounted on the surface of said drum, said detents being slidably adjustable in the direction longitudinally of said drum into one of a plurality of axially spaced radial planes, a plurality of switches arranged adjacent said drum and each having a portion lying in a corresponding one of said plurality of planes and adapted to be engaged by the detents adjusted into the corresponding radial plane, the combination comprising time controlled actuating means for notching said drum in one direction of rotation through angles of movement corresponding to the radial spacing between said detents, means for selectively positioning said detents into any of said radial planes, and means interconnecting said actuating means and said last mentioned means whereby said drum may be notched by said last mentioned means.

2. In a sequence switch apparatus including a rotatable drum, a plurality of radially spaced detents mounted on the surface of said drums, said detents being slidably adjustable in the direction longitudinally of said drum into one of a plurality of axially spaced radial planes, a plurality of switches arranged adjacent said drum and each having a portion extending into the path of travel of the detents positioned in a corresponding one of said radial planes, the combination comprising a pawl for engaging said drum and notching it with a step by step movement in one direction of rotation through angles of movement corresponding to the radial spacing between said detents, electromagnetic means for operating said pawl, and manual actuating means movable into cooperative relation with said pawl for effecting notching of said drum independently of said electromagnetic means.

3. In a sequence switch apparatus including a housing, a drum rotatably mounted in said housing, a plurality of radially spaced detents mounted on the surface of said drum, said detents being slidably adjustable in the direction longitudinally of said drum into one of a plurality of axially spaced radial planes, a plurality of switches arranged adjacent of said drum and each having a portion extending into the path of travel of the detents adjusted into a corresponding radial plane, means operatively connected to said drum for actuating said drum in one direction of rotation, the combination comprising lever means hingedly mounted in said housing, one end of said lever means extending adjacent said drum and adapted to engage with an adjacent one of said detents, manual control means for said lever means extending to the outside of said housing, said manual means being operable for causing said lever means to engage with said one of said detents and for adjusting said one detent longitudinally of said drum into any of said radial planes, and indicia means secured to said lever and visible through said housing for indicating the position of adjustment of said one detent by said lever.

4. In a sequence switch apparatus including a housing, a drum rotatably mounted in said housing, a plurality of radially spaced detents mounted on the surface of said drum, said detents being slidably adjustable in the direction longitudinally of said drum into one of a plurality of axially spaced radial planes, a plurality of switches arranged adjacent said drum and each having a portion extending into the path of travel of the detents arranged in a corresponding radial plane, actuating means operatively connected to said drum for advancing said drum in one direction of rotation through incremental angles of movement corresponding to the radial spacing between said detents, the combintion comprising hinged lever means mounted within said housing and having an end extending adjacent said drum, and manually operable means connected to said lever for shifting said lever into engagement with said detents and for selectively positioning said detents into any of said radial planes.

5. In a sequence switch apparatus including a housing, a drum rotatably mounted in said housing, a plurality of radially spaced detents mounted on the surface of said drum, said detents being slidably adjustable in the direction longitudinally of said drum into one of a plurality of axially spaced radial planes, a plurality of switches arranged adjacent said drum and each having a portion extending into the path of travel of the detents positioned in a corresponding one of said radial planes, a pawl for engaging said drum and notching it with a step by step movement in one direction of rotation through angles of movement corresponding to the radial spacing between said detents, electromagnetic means for operating said pawl the combination comprising, a rod in said housing extending transversely thereof adjacent said drum, lever means pivotally mounted upon said rod, said lever being slidable longitudinally of said rod, means on one end of said lever for engaging the detent on said drum next adjacent the lever end, a manual control element extending on the outside of said housing, said manual control element being operatively connected to said lever whereby upon rotation of said element said lever is caused to move longitudinally upon said rod, said element being longitudinally movable into engagement with said pawl to effect movement of said drum through one step and to bring said lever into engagement with said one detent.

6. In a sequence switch apparatus including a housing, a drum rotatably mounted in said housing, a plurality of radially spaced detents mounted on the surface of said drums, said detents being slidably adjustable in the direction longitudinally of said drum into one of a plurality of axially spaced radial planes, a plurality of switches arranged adjacent said drum and each having a portion extending into the path of travel of the detents positioned in a corresponding one of said radial planes, a pawl for engaging said drum and notching it with a step by step movement in one direction of rotation through angles of movement corresponding to the radial spacing between said detents, electromagnetic means for operating said pawl, the combination comprising a lever pivotally mounted in said housing and having means thereon for operatively engaging the adjacent one of said detents on said drum, means extending outside of said housing for operating said lever to effect adjustment of said detent to any of said radial planes, said last mentioned means being operatively connected to said pawl for effecting advancement of said drum by one step simultaneously with the operation of said lever.

7. In a controller including a rotatable drum, said drum including a plurality of straight parallel bars arranged in a uniformly spaced apart relation and in a cylindrical configuration, a detent slidably adjustable on each of said bars, means for adjusting said detents into one of a plurality of axially spaced radial planes, a plurality of switches arranged in a side by side relation adjacent said drum and each having a portion extending in a corresponding one of said plurality of planes, said switch portions being adapted to be engaged by the detents adjusted into the corresponding plane, a timing motor, a time switch periodically operated by said motor, an electromagnetic actuating means connected for periodic energization through said time switch, the combination comprising lever means pivotally connected to said electromagnetic means operatively engaging said drum for shifting said drum through an angle of rotation corresponding to the spacing between adjacent bars thereof, manually operable means for engaging said detents one at a time for effecting adjustment thereof upon said bars, said manually operable means including a portion for engaging with said lever to effect advancement of said drum one step prior to engagement with a detent on said drum.

8. In a radio program controller including a radio receiver, a rotatable drum, a plurality of radially spaced detents mounted on said drum, said detents being adjustable in the direction longitudinally of said drum and into one of a plurality of axially spaced radial planes, a plurality of radio station selector switches connected to said receiver arranged adjacent said drum and each having a portion extending into the path of travel of the detents arranged in a corresponding one of said radial planes, an electromagnetic actuating device for notching said drum in one direction by steps through angles of movement corresponding to the radial spacing of said detents, a clock, means controlled by said clock for effecting energization of said device at predetermined spaced intervals of time, the combination comprising lever means slidably mounted for movement longitudinally of the drum and including means for engaging one of said detents positioned next adjacent thereto, means for manually controlling said lever for effecting adjustment of said one detent into any of said radial planes, and station indicia means carried by said lever for indicating the position of said one detent upon said drum.

9. In a program controller including a rotatable drum having a plurality of switch actuating elements arranged thereupon adapted to be adjusted selectively into axially spaced radial planes and a plurality of aligned switches each having a portion extending in a corresponding one of said planes and adapted to be engaged by the elements adjusted into the corresponding radial plane, the invention comprising a rotatable drum consisting of a plurality of straight, parallel bars arranged in a cylindrical configuration, the opposite ends of said bars being supported by a pair of spaced apart disks, a sleeve slidably mounted on each of said bars for movement longitudinally thereupon, each of said sleeves including a detent portion extending outwardly of said drum and defining a switch actuating element.

10. In a program controller including a rotatably mounted drum having switch actuating elements mounted thereupon for selective adjustment into a plurality of axially spaced radial planes and a plurality of aligned switches each having a portion extending in a corresponding one of said radial planes and adapted to be engaged by actuating elements adjusted into the corresponding radial plane, the combination comprising a plurality of parallel bars of angular cross-sectional shape arranged in an equally spaced relation in a cylindrical configuration, a sleeve slidably mounted on each of said bars and adjustable thereon into one of a plurality of axially spaced radial planes, each of said sleeves including a detent portion extending outwardly therefrom and defining a switch actuating element, a plurality of spaced notches on each of said bars and cooperating spring biased means on each of said detents for facilitating the alignment of said detents in said radial planes and manually operable means arranged adjacent said drum for engaging one of said detents at a time for adjusting the position of said detents with respect to said radial planes.

11. In a sequence switch apparatus including a rotatable drum having a plurality of switch actuating elements arranged thereupon for adjustment into one or more of a plurality of axially spaced radial planes and a plurality of switches arranged adjacent said drum each having a portion extending into the path of travel of the actuating elements positioned in a corresponding one of said radial planes, the invention comprising the combination of a pair of opposite end disks, a plurality of rectangular bars extending between said disks in a parallel relation and in a cylindrical configuration defining a drum, said bars being uniformly spaced apart, a rectangular sleeve slidably mounted upon each of said bars, each of said sleeves including a detent portion extending outwardly of said drum and defining a switch actuating element, a plurality of recesses in the outer surfaces of said bars, said recesses being aligned in a plurality of radial planes, a spring biased element arranged within each of said detent portions for cooperatively seating in said recesses for releasably securing said sleeves in said radial planes.

WENDELL W. CALHOUN.

REFERENCES CITED

The following references are of record in the file of this patent:

UNITED STATES PATENTS

| Number | Name | Date |
|---|---|---|
| 1,726,520 | Kramer | Aug. 27, 1929 |
| 2,010,044 | Temple | Aug. 6, 1935 |
| 2,019,157 | Rice | Oct. 29, 1935 |
| 2,045,251 | Raber | June 23, 1936 |
| 2,096,072 | Spagnola | Oct. 19, 1937 |